United States Patent [19] | [11] Patent Number: 4,534,193
Takemura et al. | [45] Date of Patent: Aug. 13, 1985

[54] LOCK MECHANISM FOR THE GLOVEBOX DOOR OF AN AUTOMOBILE

[75] Inventors: Yukihito Takemura; Tomohide Niimi, both of Toyota, Japan

[73] Assignee: Toyota Jidosha Kabushiki Kaisha, Toyota, Japan

[21] Appl. No.: 452,135

[22] Filed: Dec. 22, 1982

[51] Int. Cl.$^3$ .............................................. B60R 25/02
[52] U.S. Cl. ......................................... 70/218; 70/472
[58] Field of Search ................. 70/472, 149, 218, 221, 70/223, 224

[56] References Cited

U.S. PATENT DOCUMENTS 2,274,455 2/1942 Murphy ................................ 70/149
4,170,119 10/1979 Kalis ...................................... 70/149
4,312,205 1/1982 Reed ..................................... 70/472

*Primary Examiner*—Robert L. Wolfe
*Attorney, Agent, or Firm*—Oblon, Fisher, Spivak, McClelland & Maier

[57] ABSTRACT

A lock mechanism for use in the glovebox door of an automobile including a lock-bar held by a guide of a main body for sliding motion in the vertical direction, a hook projecting from the guide and a striker disposed within a space defined by the lock-bar and the hook. The lock-bar and the guide are respectively provided with an elongated through aperture extending in the vertical direction and passing through in the horizontal direction. A locking plate extends through these through apertures with one end thereof engaging with a crank provided on a rotor of a cylinder type safety lock. The other end of the locking plate is engaged by a pawl of a pull-handle of the glovebox door when the cylinder type safety lock is put in the unlocked position, while the other end being disengaged from the pawl when the cylinder type safety lock is put in the locked position.

5 Claims, 4 Drawing Figures

LOCK MECHANISM FOR THE GLOVEBOX DOOR OF AN AUTOMOBILE

BACKGROUND OF THE INVENTION

1. Field of the Invention

The present invention relates generally to a locking mechanism for the glove compartment door of an automobile, and more particularly to a locking mechanism for use in the glovebox door which is hinged to the instrument panel or dashboard in front of the driver's seat of an automotive vehicle.

2. Description of the Prior Art

Among a variety of locking mechanisms for use in the glovebox door construction of an automobile, there is known the one wherein there is provided a locking-bar which is adapted to slide in the vertical direction through a guide in a frame structure or main body mounted on a glovebox door by the rotating motion of a pull-handle. This particular type of locking mechanism is of such construction that the glovebox door is duly locked with the employment of a striker which is fixed to a frame structure of the automobile and adapted to be inserted into a space defined by the mentioned locking-bar and a hook extending from the guide, and that the locking-bar is caused to be pulled downwardly to unlock by means of the above mentioned pull handle.

According to such construction, it is noted that the door lock mechanism stated above serves satisfactorily in function, as far as the prevention of the glovebox door from opening accidentally during the cruising of the vehicle is concerned. However, in the case that the jewelry or some other valuables are placed into the glovebox, it is now required that the glovebox door be locked by way of a safety lock or the like.

SUMMARY OF THE INVENTION

It is therefore a primary object of the present invention to provide a lock mechanism for use in the glovebox door of an automobile of the construction such that the glovebox door is duly held in a closed or engaged condition, assuredly prevented from an accidental opening once the glovebox door is closed manually, and also that the glovebox door can be locked-up with a safety lock, when so required.

According to the present invention, there is provided, a lock mechanism of a type of unlocking by the rotating motion of a pull handle for use in the glovebox door of an automobile which comprises a cylinder type safety lock means including a rotor having a crank at one end thereof and a casing provided in a frame structure or main body mounted on glovebox, the rotor being accommodated rotatably within the casing; a guide provided in the main body and having elongated through apertures extending in the vertical direction; a lock bar disposed slidably in the guide and having an elongated through aperture extending in the vertical direction; and a locking plate having one end thereof engaged with the crank and having the other end extending through each of through apertures and outwardly on the side opposite to that the cylinder type safety lock means is located on, the other end of the locking plate being engaged by the pawl of the pull-handle when the cylinder type safety lock means is put in an unlocked position and being released from the engagement with the pawl of the pull-handle when the cylinder type safety lock means is put in a locked position.

Other objects and features of the present invention will become apparent from the following detailed description with reference to the accompanying drawings.

DETAILED DESCRIPTION OF THE PREFERRED EMBODIMENT

Figure 1:
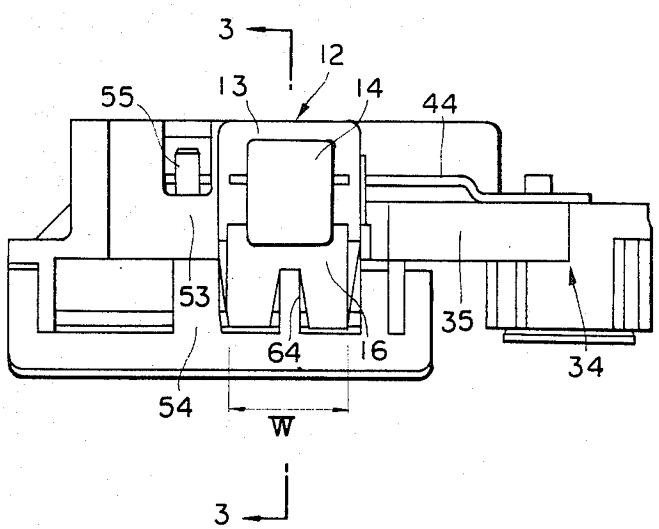
FIG. 1 is a plan view showing the locking mechanism according to the present invention.

As typically shown in FIGS. 1 through 4, the lock mechanism according to this invention is of such construction that locking function is attained by the engagement of a striker 18 into a space which is defined by a lock-bar 14 adapted to slide through a guide 13 provided in a frame structure or main body 12 which is installed onto a glovebox door 10 and by a hook 16 extending from the guide 13.

The glovebox door 10 is hinged at the lower edge thereof to the instrument panel or dashboard (not shown). The main body 12 which is mounted upon the glovebox door 10 so as to turn therewith has the guide 13 of a bottomed tubiform shape, which guide is integrally provided with the hook 16 in one of walls 20 thereof.

The lock-bar 14 is provided with a support 15 having the horizontal cross-sectional shape of a generally regular square, which is limited in its swinging motion in the fore and aft directions, as well as in the right and left directions by the four walls of the guide 13, yet movable in the vertical direction. There is provided an elongated opening or aperture 22 in the support 15. This elongated opening 22 passing through in the horizontal direction is formed extending in the vertical direction, or more specifically, the longitudinal axis of the elongated opening 22 being arranged in the vertical direction. The lock-bar 14 has a curved surface 26 and a groove or recess 27 formed in the central area of a side surface 24. The curved surface 26 is formed in such a manner tht the distance from the lower edge of the support 15 will become smaller as it comes closer towards a side surface 25 in the rear from the side surface 24 of the lock-bar 14. The groove 27 extends from the lower edge nearly to the central area of the lock-bar 14. There is provided a coil spring 28 between this groove 27 and a bottom wall 21 of the guide 13, thereby to urge the lock-bar 14 upwardly. This upward motion of the lock-bar 14 is blocked by a locking plate and a pull handle as will later be described further. The above mentioned curved surface 26 serves to hit against the striker 18, when the glovebox door 10 is pushed strongly in closing the opening of a glove compartment (not shown), thereby to eventually urge the lock-bar 14 into the inside of the guide 13 downwardly by function of the striker 18.

Figure 2:
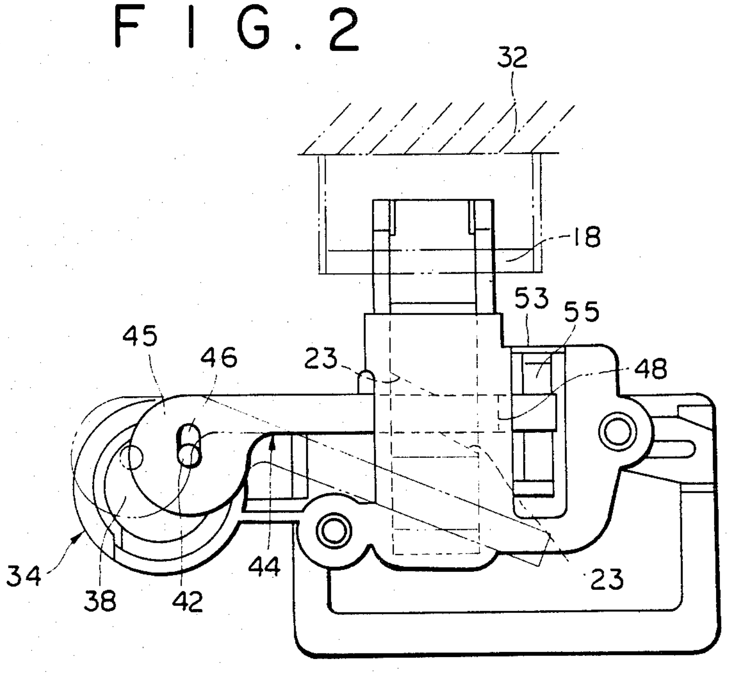
FIG. 2 is a rear side elevational view showing the same mechanism.
Figure 3:
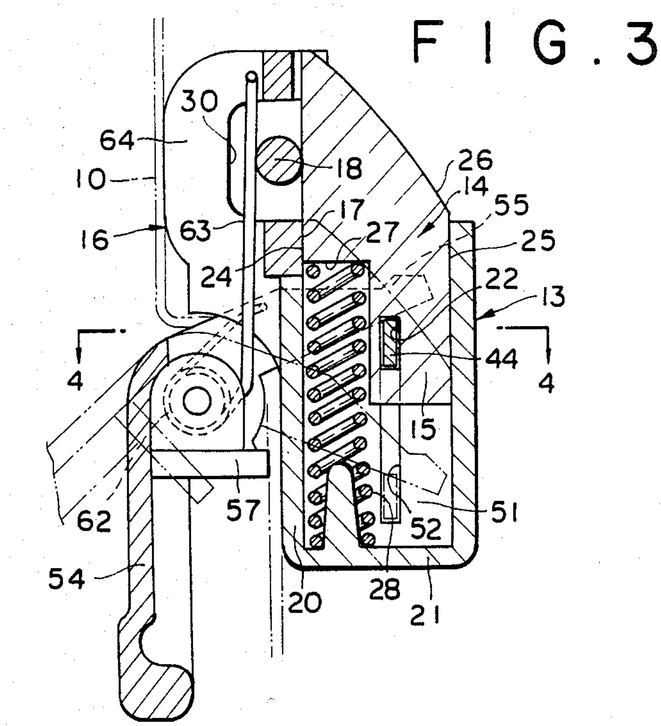
FIG. 3 is an enlarged cross-sectional view taken along the line 3-3 in FIG. 1.

As typically shown in FIG. 3, the hook 16 has a groove 30 cut away from a side surface 17 facing the lock-bar 14 and extending over the whole width W of the hook 16 (see FIG. 1). As a result, the vertical cross-section of the hook 16 presents to be generally C shaped. By virtue of the provision of the groove 30 in the hook 16, when the lock-bar 14 is caused to project upwardly, the side surface 24 of the lock-bar 14 and the side surface 17 of the hook 16 come to contact with each other, the groove 30 thus defining a space opening at the both ends thereof in the width way. When in a locking state, there is the striker 18 introduced into this space. This striker 18 is held at both ends thereof, so that it may be fixed securely in position upon an appropriate member such as a frame structure 32 of the automobile (see FIG. 2).

Figure 4:
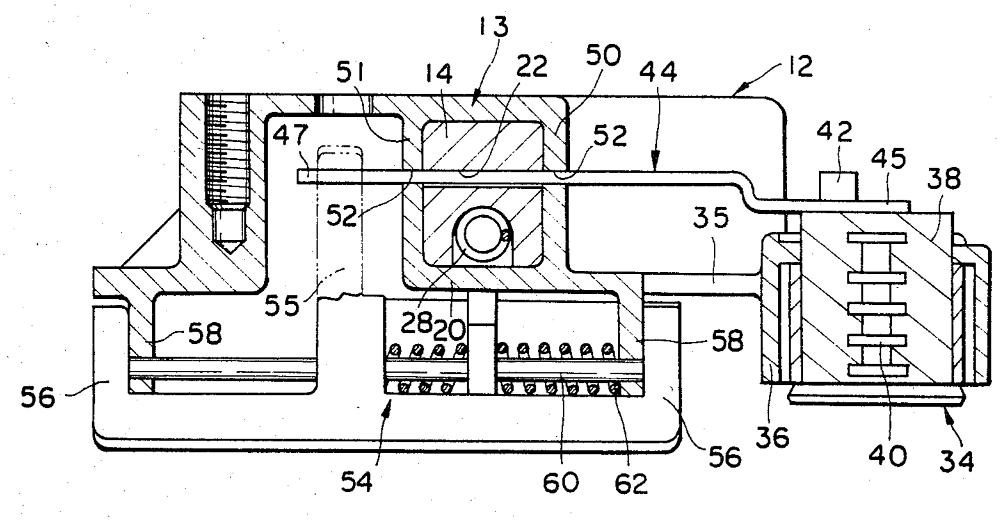
FIG. 4 is a cross-sectional view taken along the line 4—4 in FIG. 3.

It is shown in FIG. 4 that there is provided a cylinder-shaped lock 34 which comprises a casing 36 provided in the main body 12 and a rotor 38 having a crank 42 at one end thereof and held rotatably within the casing 36. As is known generally, there is provided undulated part 40 in the rotor 38 which is designed to coincide and cooperate with those on the part of a lock-key when inserted thereinto, and the key may now be rotated for a locking or unlocking motion only when the undulated part 40 on the rotor 38 and that on the key coincide exactly with each other.

In this construction, there is provided a locking plate 44 extending to engage with the cylinder lock 34. One end portion 45 of the locking plate 44 is, as shown in FIG. 2, of a generally circular shape, and an elongated opening 46 is provided extending radially outwardly from the center of the circular-shape end portion of the locking plate. The crank 42 of the rotor 38 engages loosely with the elongated opening 46.

There are provided an elongated opening 52 in two side walls 50, 51 crossing perpendicularly the side wall 20 of the guide 13 mentioned above. It is shown that the locking plate 44 extends through the elongated openings 52 and the elongated opening 22 of the above mentioned lock-bar, the other end portion 47 of the locking plate 44 projecting outwardly from the guide 13 on the side opposite the cylinder lock 34. The locking plate 44 is, as shown by solid and phantom lines in FIG. 3, adapted to rotate from the generally horizontal position diagonally downwardly as far as near the bottom wall 21. For this purpose, the extension of the elongated openings 52 in the vertical direction are made long enough to accommodate such swinging motion of the locking plate 44, accordingly. On the other hand, the elongated opening 22 provided in the lock-bar 14 has an inclined surface 23 which is adapted to approximately run parallel with the locking plate 44, when the locking plate 44 reaches the lowermost position thereof as shown by a phantom line in FIG. 2.

A pull handle 54 for elevating the lock-bar 14 is provided with a projection or pawl 55 and a pair of brackets 56, respectively. As typically shown in FIG. 4, each of the brackets 56 is fixed securely to a shaft 60 held rotatably by two supports 58 formed integrally extending from a mount 35 of the main body 12. There is also installed a coil spring 62 around the shaft 60. One end of the spring 62 is held at the ceiling portion of the pull handle 54, while the middle portion 63 of the spring 62 is shaped to be an inverted U-shape extending upwardly, so that it may be caught snugly in a groove formed in the vertical direction at the middle portion of the hook 16, as best seen in FIG. 3. The other end of the spring 62 rests upon the hook 16. By function of the spring 62, the pull handle 54 is resiliently biased in the counterclockwise as seen in FIG. 3, and in this position, the pawl 55 extending outwardly from the pull handle 54 is caused to push against an upper wall portion 53 of the main body 12, thus eventually blocking any further swinging motion thereof. The middle portion 63 of the spring 62 resting in the groove 64 in the hook serves to cooperate with the side surface 24, thereby sandwiching the striker 18. With such arrangement, the chattering of the glovebox door 10 is efficiently suppressed from occurring.

The pawl 55 of the pull handle 54 mentioned above is located across the guide 13 on the opposite side that the cylinder lock 34 is located. This pawl 55 is, as typically shown in FIG. 4, caused to engage with the end portion 47 of the locking plate 44, when the cylinder lock 34 is put in the unlocked position. With such arrangement, when the pull handle 54 is turned in pivoting motion so as to force the locking plate 44 downwardly by the engagement with the pawl 55, the lock-bar 14 is now caused to slide downwardly along the guide 13 of the main body 12. As a consequence, the glovebox door is ready to be opened manually.

Next, when the cylinder lock 34 is put in the locked state, the locking plate 44 is now caused to move to the left as shown by a phantom line in FIG. 2, and in this connection, the longitudinal dimensions of the locking plate 44 and the crank 42 are predetermined so that the end face 48 of the locking plate may depart from the pawl 55, accordingly. With such construction, it is advantageous that as the pawl 55 does not come into engagement with the locking plate 44 even if the pull handle 54 is pulled to rotate, the lock-bar 14 is now held extending upwardly, thus resulting in no opening of the glovebox door.

As fully described hereinbefore, by way of the preferred embodiment of the invention, by virtue of such advantageous construction according to the present invention that there is provided the cylinder safety lock incorporated in the main body, with the locking plate extending at its one end to engage with the crank provided on the rotor of the cylinder lock and with the other end extending outwardly from the guide of the main body and from the lock-bar to engage with the pawl of the pull handle, it is now advantageously possible in practice to have the whole lock mechanism assembly be compact in size and light in weight, thus resulting in the outstanding effect of reducing the production cost, accordingly.

What is claimed is:

1. A lock mechanism for use in the glovebox door of an automobile, comprising:
   - a pull-handle having a pawl;
   - a lock-bar biased in a locked position through a single spring and adapted to slide within a guide of a frame structure or main body mounted on the glovebox door with pivoting motion of said pull-handle
   - cylinder type safety lock means including a rotor having a crank at one end thereof and a casing provided in said main body, said rotor being rotatably mounted within said casing, said guide and said lock bar having elongated through apertures extending in a first direction, and passing through in a second direction, respectively; and
   - a locking plate disposed crosswise to and held in a biased position by said lock bar and having one end portion thereof engaged with said crank and having the other end portion extending through each of said through apertures and outwardly on the side opposite to that where said cylinder type safety lock means is located, said other end portion of said locking plate being engaged by said pawl of said pull-handle when said cylinder type safety lock means are in the unlocked position, and being released from engagement with said pawl of said pull-handle when said cylinder type safety lock means are in the locked position.

2. The glovebox door lock mechanism as claimed in claim 1 wherein said elongated through aperature of said lock-bar has an inclined surface which is adapted to approximately run parallel with said locking plate when said locking plate reaches the limit thereof.

3. The glovebox door lock mechanism as claimed in claim 1 wherein said one end portion of said locking plate is generally circular in planar shape and includes an elongated aperture extending radially outwardly from the center thereof, said crank of the rotor having a stub loosely engaging said elongated aperture.

4. A lock mechanism for use in the glovebox door of an automobile, comprising:

a pull-handle having a pawl;

a lock-bar biased in a locked position through a single spring and adapted to slide in the inside of a guide of a frame structure or main body mounted on the glovebox door with the pivoting motion of a pull-handle having a pawl;

cylinder type safety lock means including a rotor having a stub crank at one end thereof and a casing provided in said main body, said rotor being rotatably mounted within said casing; said guide including a pair of elongated through apertures provided in two opposed side walls thereof, extending in a first direction and passing through in a second direction;

a locking plate disposed crosswise to and held in a biased position by said lock bar having first and second end portions, said first end portion being formed to be generally circular in planar shape and having an elongated aperture extending radially outwardly from the center thereof, said elongated aperture being loosely engaged by said stub crank; and said lock bar including an elongated through aperture extending in said first direction, passing through in said second direction and formed with an inclined surface which is adapted to approximately run parallel with said locking plate when said locking plate reaches a predetermined position thereof, said second end portion of said locking plate extending through each of said through apertures of said guide and said lock bar, respectively, and outwardly on the side opposite to that said cylinder type safety lock means are located, said second end of said locking plate being engaged by said pawl of said pull-handle when said cylinder type safety lock means are in the unlocked position and being released from the engagement with said pawl of said pull-handle when said cylinder type safety lock means are in the locked position.

5. A lock mechanism for use in the glovebox door of an automobile, comprising:

a pull-handle having a pawl;

a lock-bar adapted to slide within a guide of a frame structure or main body mounted on the glovebox door with the pivoting motion of said pull-handle;

cylinder type safety lock means including a rotor having a crank at one end thereof and a casing provided in said main body, said rotor being rottably mounted within said casing, said guide and said lock bar having elongated through aperatures extending in a first direction, and passing through in a second direction, respectively; and a locking plate having one end portion thereof engaged with said crank and having the other end portion extending through each of said through apertures and outwardly on the side opposite to that where said cylinder type safety lock means is located, said other end portion of said locking plate being engaged by said pawl of said pull-handle when said cylinder type safety lock means are in the unlocked position, and being released from engagement with said pawl of said pull-handle when said cylinder type safety lock means are in the locked position wherein said elongated through aperature of said lock-bar has an inclined surface which is adapted to approximately run parallel with said locking plate when said locking plate reaches the limit position thereof.

* * * * *